INVENTORS
HARRY J. SADLER
ERNEST E. COOK
BY
ATTORNEY

United States Patent Office 3,062,601
Patented Nov. 6, 1962

3,062,601
PISTON CUP
Harry J. Sadler, Minneapolis, and Ernest E. Cook, Anoka, Minn., assignors to Hypro Engineering, Inc., Minneapolis, Minn., a corporation of Minnesota
Filed Jan. 16, 1961, Ser. No. 82,825
5 Claims. (Cl. 309—51)

This invention relates to piston seals and more particularly to resilient piston cup construction.

Piston cups made of rubber, rubber substitutes, and leather have been known to the art for a number of years. In general, such cups are secured at their bottom portions to piston bases and are provided with continuous forwardly projecting annular lips which press lightly against the inside of the cylinder wall. As the piston is moved forwardly in the cylinder against fluid pressure, the annular lips expand and they exert increasing pressure against the cylinder wall with increasing pressure of the compressed fluid against the piston. Because the piston cup becomes more tightly engaged with the cylinder wall with increasing pressure, the piston is less likely to leak under pressure. The frictional drag created by increasing fluid pressure against the cup is not ordinarily a handicap when a cup-type piston is used in air pumps, grease guns, master brake cylinders of automobiles, low pressure fluid pumps and so forth.

The use of resilient piston cups to the best of our knowledge has usually been associated with mechanisms operating under pressures not greatly in excess of 400 pounds per square inch. Such restriction exists because the flexibility and resilience, which is requisite to proper operation of the conventional piston cup, becomes detrimental at higher pressures. Downward compression of the lip of the cup and radial expansion of the base of the cup combine to produce an annular bulge which creates objectionable frictional drag and which, in turn, can create heat and fracture the cup material. Such distortion or bulging, except at the working edge of the cup, serves no useful function, but can shorten the life of the cup and render the operation thereof highly inefficient.

It is within the contemplation of the present invention to overcome the foregoing objections to resilient piston cups when used at higher pressures and to provide an improved cup structure which will be economical and efficient for pumping of fluids over a wide range of pressures.

Another object of the invention is to provide a piston cup which will have a low ratio of frictional drag to fluid pressure, yet will seal effectively against the cylinder wall irrespective of whether the fluid is compressed at elevated or reduced pressures.

A further object of the invention is to provide a piston cup having a composite annulus, the structure and composition of which combines flexibility and strength in such a manner as to achieve improved function and durability.

These and other objects and advantages of our invention will more fully appear from the following description, made in connection with the accompanying drawings, wherein like reference characters refer to the same or similar parts throughout the several views and in which.

Figure 1:
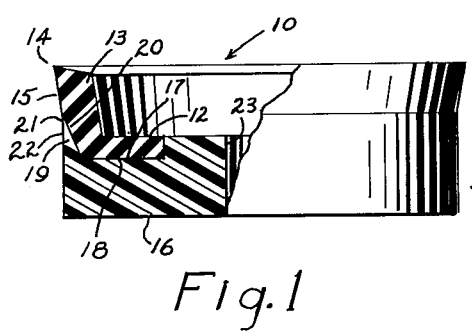
FIGURE 1 is a side elevation of our piston cup, a portion thereof being cut away in vertical section to show the relationship of the composite parts.

With continued reference to the drawing, one form of our piston cup is shown in FIGURE 1. The cup comprises a resilient member 10 and a relatively stiffer supporting member 11 as shown in FIGURE 1. The member 10 has a bottom portion or base 12 and an integrally formed upstanding lip portion 13 which terminates outwardly in an edge 14 as shown. The annular lip 13 has an outer surface 15 which flares outwardly from the bottom 12 up to the terminal edge 14.

Surrounding and backing up the cup member 10 is the relatively stiffer member 11 which may also be integrally formed to provide a bottom 16, the inner surface 17 of which engages the inner surface 18 of the member 10 as shown. The support member 11 is also provided with an annular upstanding flange 19 which has an inner surface 20 in encircling relation with the flared circumferential surface 15 of the cup member 10. The edge 21 also lies radially inward from the edge 14 as shown. The circumferential outer surface 22 of the flange 19 may be cylindrical in character or may have other configuration provided, however, no portion thereof extends outwardly beyond the terminal working edge 14 of the resilient cup member 10.

A central bore 23 may be formed through both the cup and supporting members 10 and 11 for mounting purposes as will be presently described.

Figure 2:
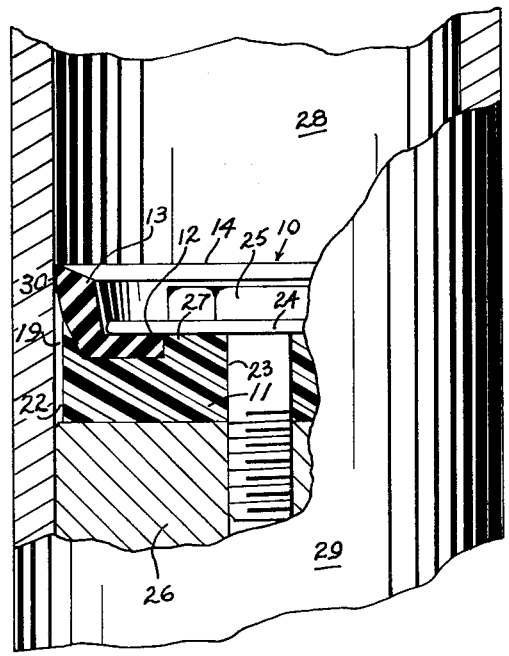
FIGURE 2 is a fragment of a cylinder and piston therewithin, the appearance of the cup under pressure being shown in vertical section.

Referring now to FIGURE 2, the piston cup of FIGURE 1 may be provided with a washer 24 placed in the concavity of cup member 10 and secured through said bore 23 with a threaded bolt 25 to piston 26. An annular boss 27, on support member 11 surrounds bolt 25 and limits the movement of washer 24 against cup base 12. The piston together with the piston cup is then inserted into the bore 28 of cylinder 29 for reciprocal relative movement against a fluid medium (not shown). Bore 28 has a diameter slightly less than that of cup member 10 at its terminal edge 14 so that it will normally exert a slight pressure upon the cylinder bore wall when operating thereagainst.

The support member 11 may have its circumferential surface 22 in sliding contact with bore wall 28 or may be in close clearance therewith to minimize frictional drag. In either event, the upstanding flange 19 will support the resilient lip 13 for a portion only of its length and permit an extending area 30 thereof to contact the bore wall 28 in a wiping pressure contact.

During use of the piston cup under fluid pressures in excess of those usually applied to resilient piston cups, the terminal edge 14 will remain in contact with the cylinder bore wall 28 at all times and increased pressures thereon will cause the narrow surface extension 30 to exert increasing force against the cylinder 29 but not to such an extent as to appreciably increase the total frictional drag between the piston cup and the bore wall 28. Distortion of the resilient member 10 is confined to the space inwardly of surface 20 of flange 19. Thus the resilient member 10 will not have any portion below the exposed extention surface 30 which will exert any kind of frictional drag against the bore wall 28 during its movement against fluid pressure. Where the gap between bore wall 28 and circumferential area 22 is increased, a somewhat resilient support 11 may be employed and a small amount of bulge or distortion can be tolerated provided it does not bring the support member 11 into a rubbing engagement with the bore wall 28. Thus the inner cup member 10 may be constructed of a rubber or rubber substitute material and the support member 11 may be constructed of a plastic material such as nylon to achieve the desired combinative effect. In all cases, however, the member 11 is relatively stiffer than cup member 10 to prevent the compression bulging and attendant frictional drag which would occur at the pressures contemplated and utilizing conventional rubber type piston cups.

Figure 3:
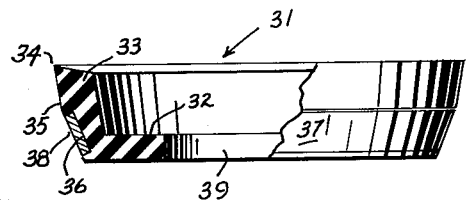
FIGURE 3 is an alternate form of composite piston cup according to our invention.
Figure 4:
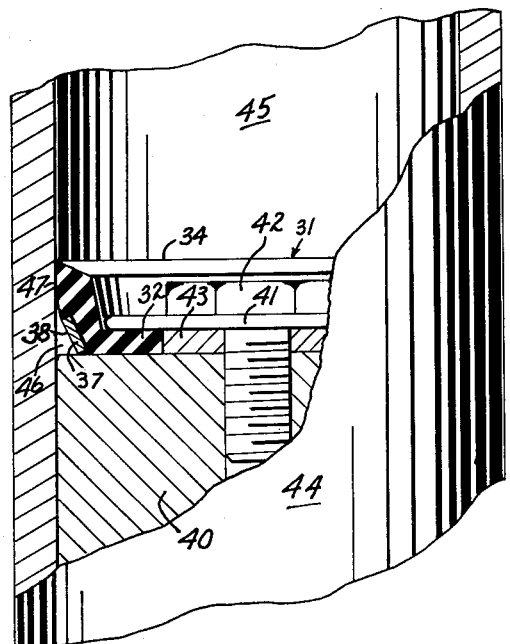
FIGURE 4 is a fragmentary view of a piston cylinder containing a piston of the alternate construction under compression, portions of the view being shown in vertical section.

Referring now to the alternate form shown in FIGURES 3 and 4, the piston cup 31 may be constructed of resilient material such as rubber and be provided with a cup bottom 32 and an upstanding annular lip 33 as shown. In the alternate form, the lip 33 terminates in an outward edge 34 in much the same manner as the outer terminal edge 14 of the first form of the invention. Here again, the lip 33 flares outwardly from the bottom 32 and the outer surface 35 increases generally in diameter from the bottom 32 to the terminal edge 34 as shown.

Rearwardly from the outermost terminal edge 34 of the cup 31 and recessed in the surface 35 thereof is an annular groove 36 which surrounds the exterior surface of the cup. Within groove 36 is a band 37 constructed of relatively stiffer material than that of the resilient cup 31. The outer surface 38 of band 37 lies radially inward from the terminal working edge 34 and may be so selected as to provide a guiding contact when utilized within a cylinder.

Referring now to FIGURE 4, the piston cup 31 may be secured through a central opening 39 to piston 40 by means of a washer 41 and bolt 42 threadedly secured to the top of piston 40 as shown. A spacing collar 43 permits bolt 42 to be drawn tight without crushing cup bottom 32. The piston and cup 31 are then inserted within cylinder 44 and in sliding engagement with the bore wall 45. The clearance 46 between the outer surface 38 of band 37 and the bore wall 45 may be so small as to provide a working engagement between the band and the cylinder 44 or may be increased to prevent contact therebetween. In either event, the band 37 confines the annular distortion of cup 31 when placed under pressure so that the aforementioned frictional rubbing does not exist between any portion of the cup 31 below the working surface 47 adjacent the terminal edge 34.

In summary, our piston cup achieves through a composite structure of materials having a differential resilience, the efficiency of a conventional piston cup operating at low pressures even when used under high pressures which would render the conventional cup unusable or short lived because of its distortion and attendant frictional drag.

It will, of course, be understood that various changes may be made in the form, details, arrangements and proportions of the parts without departing from the scope of our invention as set forth in the appended claims.

What is claimed is:

1. A piston assembly comprising a cylinder, a piston reciprocably positioned within said cylinder, an integrally formed resilient cup body having an upstanding annular lip with an inner and an outer surface, said lip flaring circumferentially outward and terminating in a terminal working edge in resilient engagement with said cylinder, a relatively stiffer non-expansible annular support member engaging and encircling the outer surface of said annular lip rearwardly of said terminal edge, said annular support member having a height sufficient to provide an edge located approximately midway between the top and bottom of said lip about which said lip can flex and said annular member contacting said lip throughout the height of said member, and means securing together and maintaining the relative positions of said cup body, said support member and said piston.

2. The assembly set forth in claim 1 wherein said support member lies in slight annular clearance with said cylinder.

3. A piston cup comprising a resilient body including a horizontal base flange and an upstanding, outwardly flaring lip extending about the periphery of said base flange, and a relatively stiffer non-expansible annular support member provided with an upstanding flange having an outwardly sloping inner wall surface terminating approximately midway of the height of said lip in a narrow top edge about which said lip can flex outwardly in accordance with the amount of pressure to which the upper portion of said lip is subjected, said resilient body having engagement with said annular support member and its said upstanding flange in the region of said flange and said support member and said lip having a thickness approximating the height of said flange.

4. The piston cup set forth in claim 3 in which said edge about which said lip can flex provides a line engagement with said lip.

5. The piston cup set forth in claim 3 in which said base flange is of annular configuration, said cup additionally having a washer confronting the upper surface of said flange and a bolt member passing through said flange and said support member for attaching said cup to a piston element.

References Cited in the file of this patent

UNITED STATES PATENTS

| | | |
|---|---|---|
| 742,784 | Fraley | Oct. 27, 1903 |
| 1,075,468 | Edgecomb | Oct. 14, 1913 |
| 1,751,445 | Davis | Mar. 18, 1930 |
| 1,767,936 | McElroy et al. | June 24, 1930 |
| 2,029,367 | Geyer | Feb. 4, 1936 |
| 2,079,998 | Millmine | May 11, 1937 |
| 2,081,040 | King | May 18, 1937 |
| 2,315,944 | Dick | Apr. 6, 1943 |
| 2,512,098 | Gratzmuller | June 20, 1950 |
| 2,914,369 | Hayman | Nov. 24, 1959 |
| 2,985,358 | Lee et al. | May 23, 1961 |